US008488152B2

(12) United States Patent
Yamada (10) Patent No.: US 8,488,152 B2
(45) Date of Patent: Jul. 16, 2013

(54) PRINT CONTROL APPARATUS AND PRINTING APPARATUS

(75) Inventor: Kei Yamada, Atsugi (JP)

(73) Assignee: Konica Minolta Business Technologies, Inc. (JP)

( * ) Notice: Subject to any disclaimer, the term of this patent is extended or adjusted under 35 U.S.C. 154(b) by 712 days.

(21) Appl. No.: 12/419,870

(22) Filed: Apr. 7, 2009

(65) Prior Publication Data

US 2009/0262393 A1 Oct. 22, 2009

(30) Foreign Application Priority Data

Apr. 18, 2008 (JP) .................................. 2008-109627

(51) Int. Cl.
G06F 15/00 (2006.01)
G06F 3/12 (2006.01)
G06K 1/00 (2006.01)
G06K 15/00 (2006.01)

(52) U.S. Cl.
USPC ........................................ 358/1.15; 358/1.14

(58) Field of Classification Search
USPC .............................................. 358/1.13–1.16
See application file for complete search history.

(56) References Cited

U.S. PATENT DOCUMENTS 6,614,546 B1 * 9/2003 Kurozasa .................... 358/1.15
2009/0168100 A1 * 7/2009 Huster ......................... 358/1.15

FOREIGN PATENT DOCUMENTS

JP 09-212325 8/1997
JP 2006-327016 12/2006

OTHER PUBLICATIONS

Japanese Notification of Reason for Rejection issued by JPO on Jan. 26, 2010, in connection with Appl. No. 2008-109627, 2 pgs.
Translation of Japanese Notification of Reason for Rejection issued by JPO on Jan. 26, 2010, in connection with Appl. No. 2008-109627, 3 pgs.

* cited by examiner

*Primary Examiner* — Douglas Tran
(74) *Attorney, Agent, or Firm* — Squire Sanders (US) LLP (57) ABSTRACT

In the case that a control section takes out a print job from an output queue, the control section notifies a terminal device being a transmitting source of the print job of a termination notice that a period to permit to change a print condition related to the print job has been terminated. However, when the control section receives a change request to change the printing condition for the print job before notifying the termination notice, the control section replaces the print job registered in the output queue with a print job having a changed printing condition in accordance with the change request.

14 Claims, 7 Drawing Sheets

| USER | DOCUMENT NAME | STATUS | REGISTERED TIME | THE NUMBER OF DOCUMENT SHEETS | THE NUMBER OF COPIES | |
|---|---|---|---|---|---|---|
| tanaka | FILE A | UNDER PRINTING | 20:30:02 | 10 | 1 | CHANGE IMPERMISSIBLE |
| yamada | FILE B | WAITING FOR PRINTING | 20:31:15 | 15 | 3 | CHANGE PERMISSIBLE |
| satou | FILE C | WAITING FOR PRINTING | 20:31:23 | 20 | 2 | CHANGE PERMISSIBLE |
| yoshida | FILE D | WAITING FOR PRINTING | 20:31:35 | 12 | 3 | CHANGE PERMISSIBLE |
| yamada | FILE E | WAITING FOR PRINTING | 20:31:40 | 10 | 1 | CHANGE PERMISSIBLE |
| yoshida | FILE F | WAITING FOR PRINTING | 20:31:42 | 5 | 1 | CHANGE PERMISSIBLE |

PRINT CONTROL APPARATUS AND PRINTING APPARATUS

This application is based on Japanese Patent Application No. 2008-109627 filed on Apr. 18, 2008 in Japanese Patent Office, the entire content of which is hereby incorporated by reference.

BACKGROUND OF THE INVENTION

The present invention relates to a print control apparatus and a printing apparatus capable of changing a printing condition for a print job for which a reception process has be already finished.

Generally, if a usual print job is transmitted from a terminal device, such as an information processing apparatus to a printing apparatus or a print control apparatus to achieve a spool function, a rasterizing process related to the print job is carried out to produce image data, and the image data are memorized. Thereafter, the print job is related with this image data, and is registered in the back end of an output queue. The printing related to the registered print job is executed by the use of the memorized image data related with the print job in the order from the leading end in the output queue.

Further, in the case of a confidential print for which printing is not started immediately upon receipt of data from a terminal device, the print job is memorized on the condition that a rasterizing process and a registration in an output queue are not conducted (such a print job is referred to as a non-extended job). The non-extended job is subjected to a rasterizing process and printed at the time of receiving an output instruction later on.

With regard to the non-extended job, there is a technique of linking plural jobs and printing collectively as one job (for example, refer to Japanese Patent Unexamined Publication No. 2001-130082).

In the case of the non-extended job, even after a job has been transmitted from a terminal device to a printing apparatus, there exists a technique to make it possible to conduct some change, such as a change to unify plural jobs into one job. However, for a usual print job which is subjected to a rasterizing process immediately after having been received and is registered in an output queue, in order to conduct some change such as addition of a process to bind with a staple and a print mode change to change the print mode designation of one side printing to both side printing after the print job has been transmitted from a terminal device, there is only a method with which the print job is once deleted from an operation panel of a printing apparatus and another print job with a changed printing condition is transmitted separately from the terminal device. Therefore, the changing operation is not easy. Further, a print job has been once deleted and then another print job is retransmitted. Accordingly, there is a problem that the registration order of the another print job in the output queue is ranked down and the waiting time for obtaining a print becomes longer.

SUMMARY OF THE INVENTION

The present invention tends to solve the above-mentioned problem, an object of the present invention is to provide a print control apparatus and a printing apparatus in which a printing condition related to a print job registered in an output queue can be changed from a terminal device after the print job has been subjected to a rasterizing process, and a user can recognize a period capable of changing the printing condition.

The gist of the present invention to attain the above object resides in the following print control apparatus.

The print control apparatus, comprises:
a communicating section to communicate with a terminal device;
a memory section to store image data therein;
a control section to control operations of the print control apparatus;
wherein the control section conducts (1) an extension register process, (2) an output process, (3) a period termination notice process, and (4) a change process;
in (1) the extension register process, when the control section receives a print job from the terminal device, the control section produces image data related to the print job by a rasterizing process and stores the image data in the memory section, and then the control section relates the print job with the image data and registers the print job in an output queue;
in (2) the output process, the control sections takes out the print job from the output queue and makes a printing device to conduct printing related to the print job by using the stored image data related with the print job;
in (3) the period termination notice process, when the control section takes out the print job from the output queue, the control section notifies the terminal device being a transmitting source of the print job of a termination notice that a period to permit to change a print condition related to the print job has been terminated; and
in (4) the change process, when the control section receives a change request to change the printing condition for the print job before notifying the termination notice, the control section replaces the print job registered in the output queue with a print job having a changed printing condition in accordance with the change request.

DETAILED DESCRIPTION OF THE PREFERRED EMBODIMENT

Hereafter, a preferable embodiment of the present invention will be explained. However, the present invention is not limited to this embodiment.

(1) A print control apparatus reflecting one aspect of the present invention is equipped with a communicating section, a memory section and a control section, wherein the control section conducts:

an extension register process in which, when the control section receives a print job from the terminal device, the control section produces image data related to the print job by a rasterizing process and stores the image data in the memory section, and then the control section relates the print job with the image data and registers the print job in an output queue;

an output process in which the control sections takes out the print job from the output queue and makes a printing device to conduct printing related to the print job by using the stored image data related with the print job;

a period termination notice process in which, when the control section takes out the print job from the output queue, the control section notifies the terminal device being a transmitting source of the print job of a termination notice that a period to permit to change a print condition related to the print job has been terminated; and a change process in which, when the control section receives a change request to change the printing condition for the print job before notifying the termination notice, the control section replaces the print job registered in the output queue with a print job having a changed printing condition in accordance with the change request.

In the above invention, before starting printing for a job registered in an output queue after the print job has been subjected to a rasterizing process, a termination notice that a period to permit to change a print condition related to the print job has been terminated is notified to a terminal device being a transmitting source of the print job. With this, the terminal device can recognize the termination of a period to permit to change the printing condition, whereby it is possible to prevent a change request from erroneously being issued after the period has terminated.

(2) In the print control apparatus described in (1), the control section conducts the change process without changing the order of the print job registered in the output queue.

In the above invention, since the order of the print job in the output queue is maintained even if the print condition is changed, the waiting time for obtaining a printed matter is not prolonged due to the change of the printing condition.

(3) In the print control apparatus described in (1) or (2), the control section replaces the image data stored in the memory section and related to the print job designated by the change request with image data produced on the changed printing condition in accordance with the change request.

In the above invention, a rasterizing process is conducted in accordance with the changed printing condition so as to produce new image data, and the image data before the changing are replaced with the new image data.

(4) In the print control apparatus described in any one of (1) to (3), when the extension register process with regard to the print job received from the terminal end has been completed, the control section further conducts a period start notice process to notify the terminal device of a start notice that the period to permit to change the printing condition related to the print job has been started.

In the above invention, when the print job is registered in the output queue, a start notice that the period to permit to change the printing condition related to the print job has been started is notified to the terminal device being the transmitting source of the print job.

(5) The print control apparatus described in any one of (1) to (4) is provided with a printing section and the control section of the print control apparatus makes the printing section to conduct the printing in the output process.

According to the print control apparatus and the printing apparatus, a printing condition related to a print job registered in an output queue after a rasterizing process can be changed from a terminal device, and the terminal device can be made to recognize a period to permit to change the printing condition.

Hereafter, an embodiment of the present invention will be described with reference to the drawing.

Figure 1:
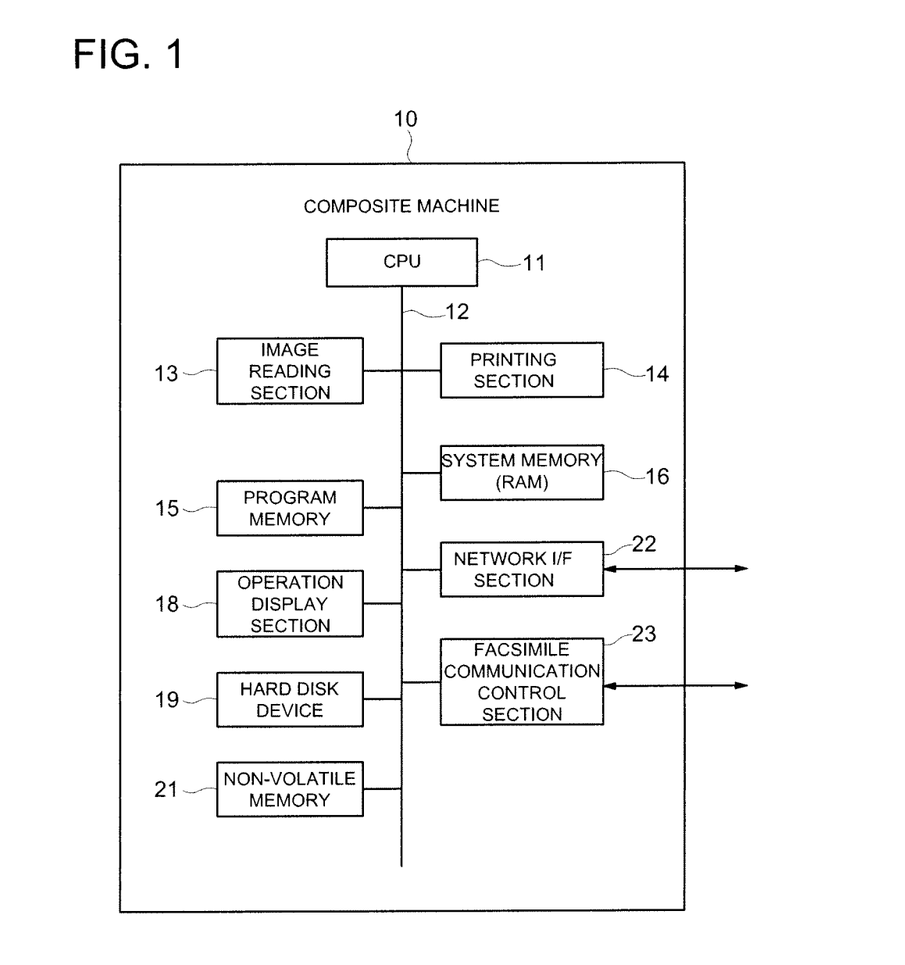
FIG. 1 is a block diagram showing an outline structure of a composite machine including a print control apparatus according to an embodiment of the present invention.

FIG. 1 shows an outline structure of a composite machine 10 as a printing apparatus equipped with a print control apparatus according to one embodiment of the present invention. The composite machine 10 is equipped with a copy function which reads a document optically and prints a duplicate image on a recording sheet; a scanning function which makes a file of image data of read document and stores or transmits the file to an external terminal device; a printer function (a function as a printing apparatus) which prints on a recording sheet based on printing data received from an external terminal device; and a facsimile function which transmits and receives image data.

The composite machine 10 is equipped with a CPU (Central Processing Unit) 11 as a control section which controls generally operations of the composite machine 10, and an image reading section 13, a printing section 14, a program memory 15, a system memory 16, a operation display section 18, a hard disk drive 19, a non-volatile memory 21, a network I/F section 22, and a facsimile communication control section 23 are connected to the CPU 11 through a bus 12.

The image reading section 13 achieves the function which reads a document optically and obtains image data. The image reading section 13 comprises, for example, a light source to irradiate a document with light; a line image sensor which reads the document by one line in a width direction in response to light reflected from the document; a shifting section to shift a reading position sequentially by a unit of one line in a length direction of the document; an optical path constituted by a lens, a mirror, and so on to lead light reflected from the document to a line image sensor to form an image; and a converter to convert output signals from the line image sensor into digital signals.

The printing section 14 achieves the function which prints an image on a recording sheet based on inputted image data. Here, the printing section 14 is constituted as a so-called laser beam printer which comprises a conveying device of recording sheets, a photoreceptor drum, a charging device, a laser unit, a developing device, a transfer separating device, a cleaning device, and a fixing device, and performs an image formation by an electrophotographic process.

The program memory 15 stores various kinds of programs, and the CPU 11 executes various kinds of processes in accordance with these programs. The system memory 16 is used as a work memory and image memory which store various kinds of data temporarily when CPU 11 executes programs. The non-volatile memory 21 stores various kinds of information to be stored even if a power source is turned off, such as count data indicating the operating frequency of each function of the composite machine 10 in addition to information required for user authentication, such as a user name, user ID, and a password.

The operation display section 18 is constituted by a liquid crystal display (LCD) provided thereon a touch panel to detect a pushed coordinates position and various control switches, such as a ten key and a start button, and the operation display section 18 indicates various kinds of operation screens and setting screens, and guiding screens, and receives various kinds of operations from a user.

The network I/F section 22 achieves the function which communicates with an external terminal device through a network. The facsimile communication control section 23 performs communication control for a facsimile transmission or facsimile reception.

The hard disk drive 19 is a large amount non-volatile memory device. The hard disk drive 19 stores data related to a print job received from an external terminal device and image data after being rasterized.

Figure 2:
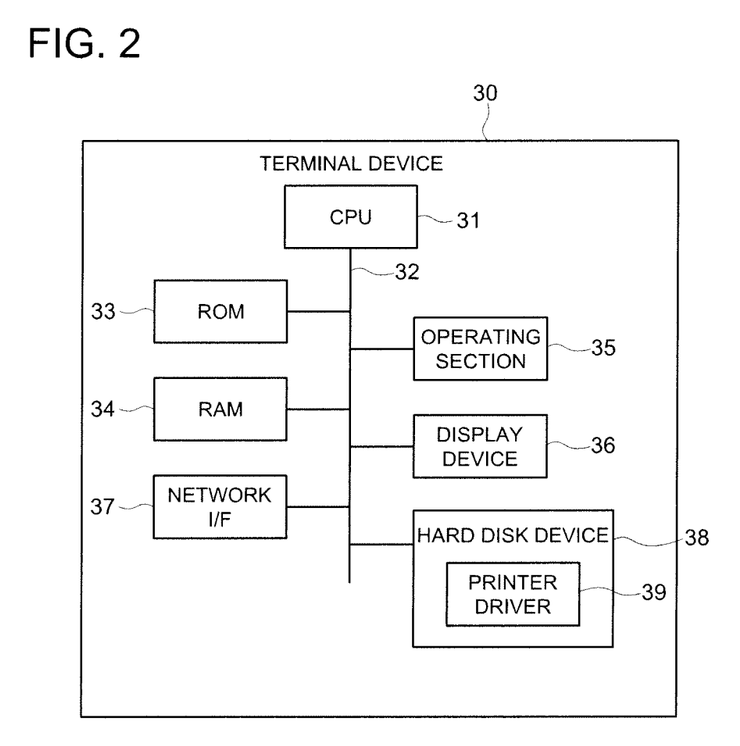
FIG. 2 is a block diagram showing an outline structure of a terminal device to request printing for a composite machine.

FIG. 2 shows an outline structure of a terminal device 30 which requests printing to the composite machine 10. The terminal device 30 is structured such that a ROM (Read Only Memory) 33, a RAM (Random Access Memory) 34, an operating section 35, a display device 36, a network I/F 37, a hard disk drive 38, and the like are connected via a bus 32 to CPU 31 to control the operations of the terminal device 30.

The ROM 33 stores an initial stage program for starting the terminal device 30. The hard disk drive 38 stores an OS program, an application program which can create document data and drawing data, in addition, a program of the printer driver 39 corresponding to the composite machine 10 and so forth. The RAM 34 is used as a work memory and the like. The CPU 31 read out a required program from the hard disk drive 38 to the RAM 34 and uses it on there.

The operating section 35 is constituted by a keyboard, a mouse (pointing device), and the like, and receives various kinds of input operations from a user. The display device 36 is constituted by liquid crystal displays and the like, and achieves the function which indicates various kinds of screens, such as an operation screen for a user. The network I/F 37 achieves the communication control function for conducting transmitting and receiving of various kinds of data for the composite machine 10 through a network.

Next, the operations of the composite machine 10 are explained.

When the composite machine 10 receives a usual print job from the terminal device 30, the composite machine 10 performs a rasterizing process promptly to produce image data in a bit map format, makes the print job related to the image data and registers the print job into the back end of an output queue (printing spool). Then, the composite machine 10 takes out a print job sequentially from the leading end of the output queue, and conducts printing with regard to the print job by using the image data stored with the relation with the printing job. An output queue is produced in the system memory 16, for example. Further, the usual print job is a print job set up so as to start printing immediately.

Here, instead of taking out a print job from the output queue, the status of the print job is changed from "waiting for printing" to "under printing (during printing)", and when the printing has been completed, the print job is deleted from the output queue. That is, the phrase "taking out a print job from an output queue" corresponds to start printing of a print job waiting for printing. Here, when starting printing of a print job, the structure may be made such that the print job is actually taken out from an output queue, shifted to an execution job registration area provided separately, and managed under there.

The composite machine 10 is further structured to make it possible to receive a change of setting in the printing condition of a print job waiting for printing in the output queue. Further, when taking out a print job from an output queue and starting printing (by changing the status from "waiting for printing" into "under printing"), the composite machine 10 has a function to notify the terminal device being the transmitting source of the print job of a termination notice that a period during which a change of setting in a printing condition can be made has been terminated.

Figure 3:
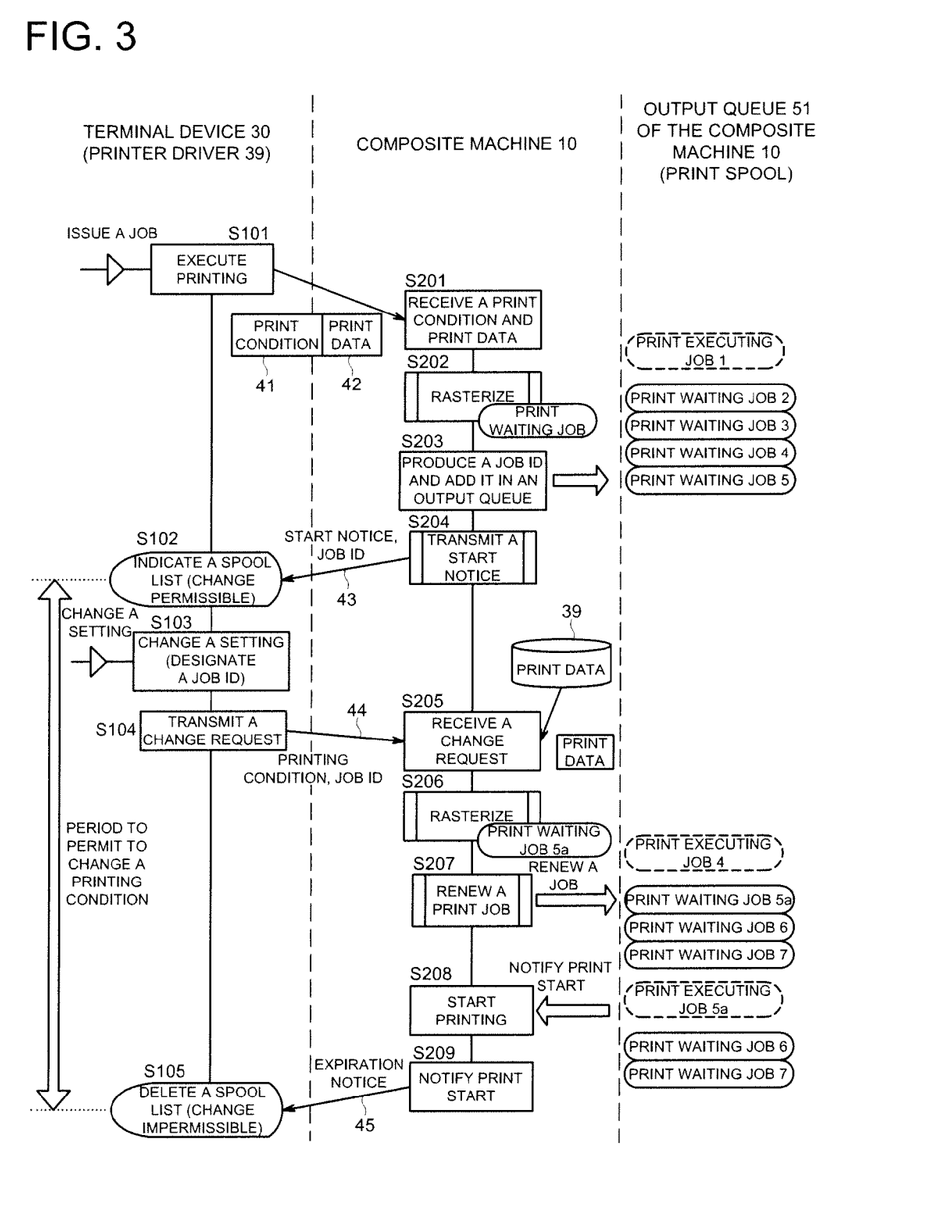
FIG. 3 is an explanatory diagram showing the whole sequence of print operations by the composite machine and terminal device according to an embodiment of the present invention.

FIG. 3 shows the whole sequence of the above-mentioned printing operations. First, a usual print job is transmitted from the terminal device 30 to the composite machine 10 (Step S101). At this time, print data 42 as data related to the print job and printing condition data 41 indicating a printing condition (the content of setting in the printing) at the time of conducting printing based on this printing data 42 are transmitted from the terminal device 30 to the composite machine 10. The printing condition data 41 show the number of copies, the necessity of stapling, one side printing or both side printing, a N-in-1 mode setting, and the like. The printing condition data 41 is configured by, for example, a control command, such as PJL (Printer Job Language). The print data 42 is configured by, for example, character strings and figures of a printing object and chord information indicating a format.

The composite machine 10 receives a print job (the printing condition data 41 and print data 42) (Step S201), rasterizes the print data 42 in accordance with the printing condition data 41, and produces image data (Step S202). Then, after the rasterizing process, the composite machine 10 assigns the print job with a job ID, makes the print job related with the image data produced previously, and registers the print job at the back end of the output queue (printing spool) 51. The print job is made as a print job with the status "waiting for printing" at the time of the registering. In the example of FIG. 3, a print waiting job 5 with the job ID "5" is registered at the back end of the output queue 51 at Step S203. Here, the received print data 42 is related with a job ID, and is stored in the hard disk drive 19 until the printing related to the print job has been completed.

Figure 4:
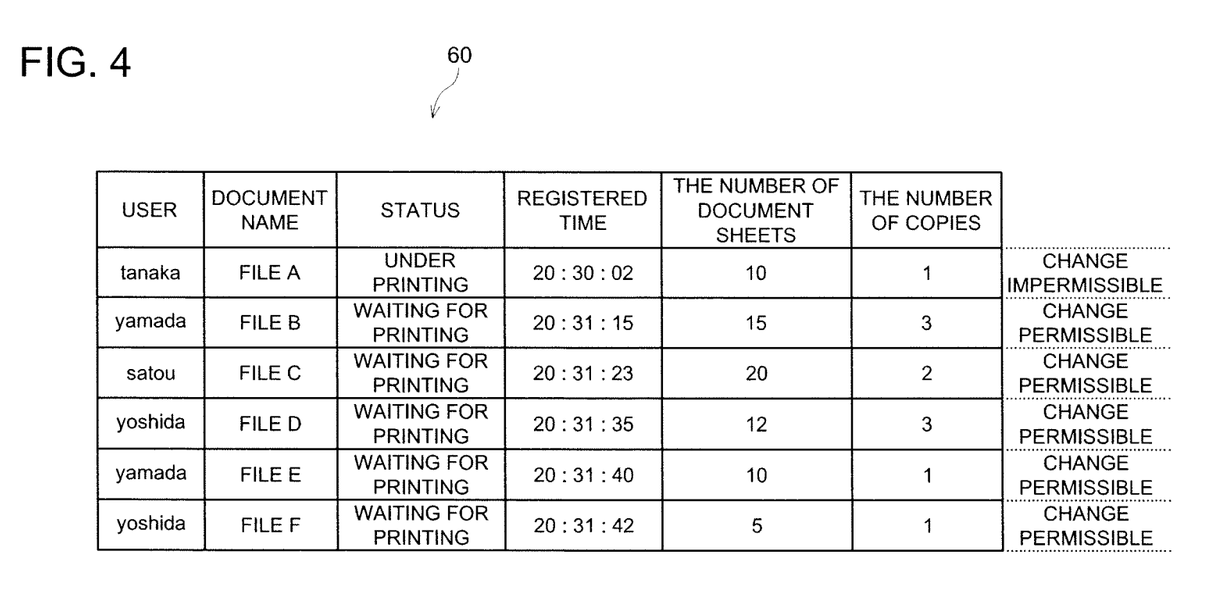
FIG. 4 is a front view showing an example of a job list screen indicated on an operation display section of the composite machine according to an embodiment of the present invention.

FIG. 4 shows an example of a job list screen 60 indicated on the operation display section 18 of the composite machine 10. On the job list screen 60, information about print jobs which are registered in the output queue 51 and are waiting for printing or under printing, is displayed in accordance with the order in the output queue 51. In detail, on the job list screen 60, the following items are indicated for each print job: such as the name of a user (transmitting person) of the print job, the name of a document (the name of a file) of a printing object, the status ("under printing" or "waiting for printing"), the registration time indicating the time at which the print job was registered in the output queue 51, the number of document sheets, the number of print copies, and the like.

In the composite machine 10, print jobs being waiting for printing are permitted to change setting in the printing conditions of them. However, after the status of a print job has been changed from "waiting for printing" to "under printing", the print job is not permitted to change the setting in the printing condition related to the print job. FIG. 4 shows "permissible" or "impermissible" as the propriety of a change of setting for each print job for the sake of convenience in explanation.

Furthermore, when a print job is registered additionally in the output queue 51, the CPU 11 of the composite machine 10 transmits a start notice indicating a fact that a period to permit to change setting in a printing condition related to the print job has been stated (in other words, the print job has been registered in a output queue) together with its job ID to the terminal device being the transmitting source of the job (Step S204).

The printer driver 39 of the terminal device 30 recognizes the condition of the print job transmitted from the terminal device 30 to the composite machine 10 based on a start notice 43 and a termination notice 45 mentioned later transmitted from the composite machine 10, and indicates the status of the print job on a predetermined screen on the display device 36 (Step S102).

Figure 5:
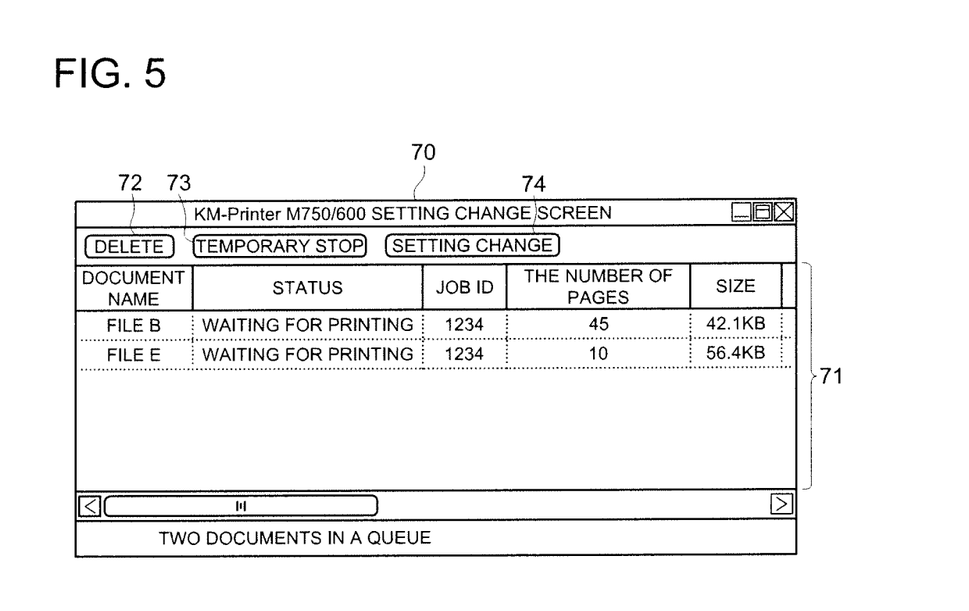
FIG. 5 is a front view showing an example of a setting change screen indicated by a printer driver of a terminal device.

FIG. 5 shows an example of a setting change screen 70 which the printer driver 39 of the terminal device 30 indicates on the display device 36 of the terminal device 30 in accordance with an indication request from a user. On the setting change screen 70, a spool list 71 showing in the form of list information about print jobs transmitted from the terminal device 30 to the composite machine 10, a deleting button 72, a temporary stop button 73, and a setting change button 74 for a print job are indicated. On a spool list 71A, the name of a document, a condition, a job ID, the number of pages, the size (amount of data), a time received, and the like are indicated for each print job.

FIG. 5 illustrates a setting change screen 70 indicated on the terminal device 30 of a user (Yamada) in the case that the output queue 51 of the composite machine 10 is on the condition shown in FIG. 4. Since a print job related to a file B and a print job related to a file E are on the status being waiting for printing in the user (Yamada), the print job related to the file B and the print job related to the file E are indicated as on the status being waiting for printing on the setting change screen 70 of the terminal device 30 of the user (Yamada).

After the selection of a print job waiting for printing has been received in the setting change screen 70, when the setting change button 74 is operated, the printer driver 39 displays a changing screen (not sown in any figure) for the printing condition, and receives the changing operation for the printing conditions (Step S103). On the changing screen, for example, the contents of the printing condition currently set up for the print job are indicated as defaults and a user is allowed to change only the necessary items. For example, the changing operations to change a single side printing into a both side printing and to set a 2-in-1 mode to print reduced images of two pages onto one page are received.

When the reception of the changing operations for the printing condition has been completed and the execution instruction of the changes has been received, the printer driver 39 of the terminal device 30 transmits a change request 44 including the job ID of the print job expected to change the printing condition data showing the content of the change to the composite machine 10 (Step S104). The print data are not contained in the change request 44, and only printer control commands, such as PJL constituted by XML (Extensible Markup Language) and the job ID are transmitted. The print data 42 is stored in the composite machine 10.

Upon receipt of the change request 44 (Step S205), the composite machine 10 recognizes the print job as a change target from the job ID contained in the change request 44, reads out the print data 42 related to the job ID from the hard disk drive 19, and produces image data (referred to as new image data) by conducting a rasterizing process based on the print data and the printing condition having been changed with regard to the items included in the change request 44 (Step S206).

Furthermore, the composite machine 10 replaces the former print job (before changing) having the job ID and registered in the output queue 51 before the changing with the changed print job related with the new image data after the changing, whereby the composite machine 10 renews the print job (Step S207). In this way, since the former print job existing in the output queue before the changing is replaced with the changed print job after the changing, the registration order of the print job in the output queue 51 is not changed. In the example shown in FIG. 3, the print waiting job 5 is replaced with the print waiting job 5a having the same job ID.

Here, the above structure may be made to judge based on the content of the change of the print condition whether to start again the rasterizing from the beginning. For example, in the case of the change of a new print condition in which a process to bind with a staple is added and image data do not need to be changed, the former image data may be used as it is and another rasterizing process based on the new print condition may be omitted. On other hand, in the case that the enlarging or reducing ratio of an image is changed, or in the case that a 2in1 process is newly set up so as to print two pages on one page by reducing, anther rasterizing process is conducted based on the changed printing condition after the changing.

The composite machine 10 carries out the printing process for print jobs registered in the output queue 51 in the order from the leading end. When the printing process for a print job under printing has been completed, the print job is deleted from the output queue 51. Then, the status of a print job becoming newly the leading end in the output queue is changed from "waiting for printing" to "under printing", and the printing process for the print job is started (Step S208).

When the status of the print job is changed from "waiting for printing" to "under printing" (the print job is taken out from the output queue 51 and the printing process for this print job is started), the composite machine 10 transmit to the terminal device being the transmission source of the print job a termination notice to indicate that a period to permit to change the setting of a printing condition has been terminated (Step S209). The termination notice includes the job ID of the print job for which a period to permit to change the setting of a printing condition has been terminated. Here, it is desirable to start printing after the termination notice 45 has been transmitted previously.

The print driver 39 of the terminal device 30 which has received the termination notice 45 deletes the print job of the job ID contained in the termination notice 45 from a spool list 71 (Step S105). Thereby, hereafter, the change of a setting of the printing condition cannot be permitted for the print job of the job ID from the terminal device 30.

That is, after the terminal device 30 has received from the composite machine 10 a start notice 43 related to a print job having been transmitted from the terminal device 30 to the composite machine 10, during a period until the terminal device 30 receives a termination notice 45 related to the print job, the change of a setting of the printing condition can be permitted for the print job on the setting change screen 70 of the terminal device 30.

In this way, since a period to permit a change of a setting is notified from the composite machine 10 to the terminal device 30 in real time so that and the printer driver 39 at the terminal device 30 side is made to recognize the period, it is possible to prevent the situation that a change of a setting of the printing condition is conducted for the print job at the printer driver 39 side after the composite machine 10 has stated printing.

Figure 6:
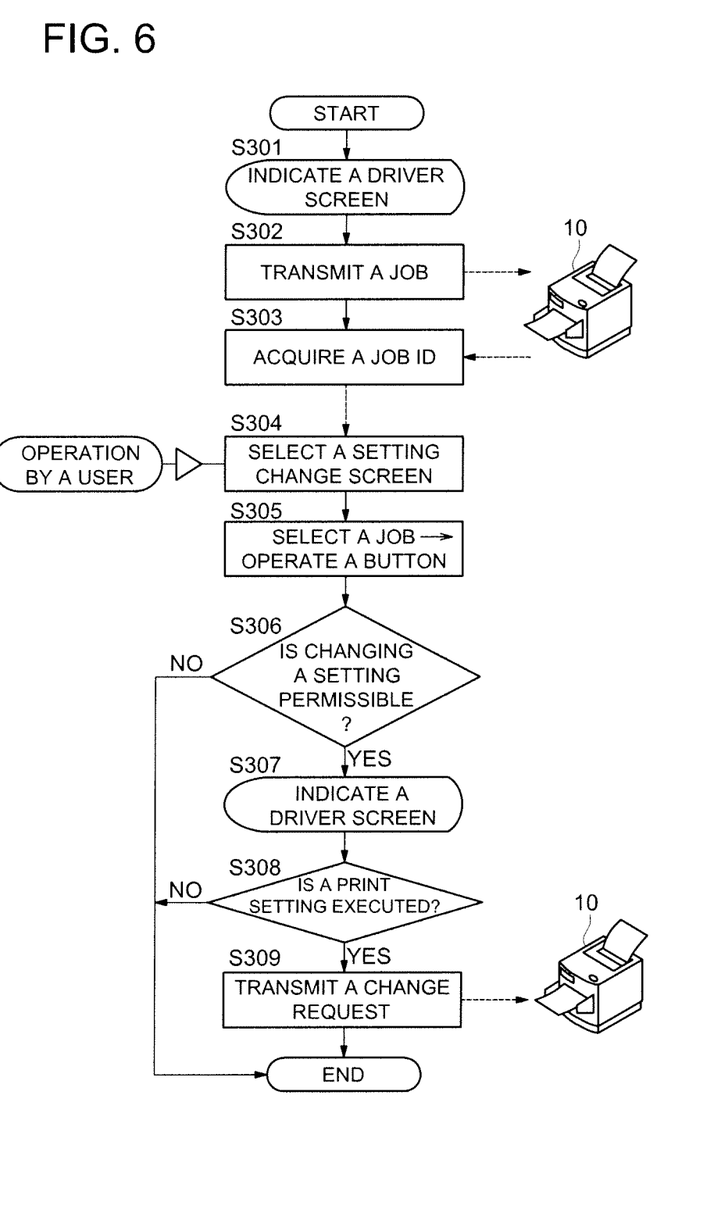
FIG. 6 is a flow chart showing processes at a printer driver side of the terminal device in the whole sequence shown in FIG. 3.

FIG. 6 shows the processes of the printer driver 39 of the terminal device 30 in the whole sequence shown in FIG. 3. The printer driver 39 indicates a driver screen on the display device 36 (Step S301). When the printer driver 39 receives a transmission instruction of a print job from a user on this driver screen, the printer driver 39 transmits data (printing condition data 41 and print data 42) related to the print job to the composite machine 10 (Step S302). Then, the printer driver 39 receives a start notice 43 related to the print job from the composite machine 10, and recognizes the job ID of the print job and the status (the job data have been rasterized and spooled) (step S303).

Thereafter, when the printer driver 39 receives a predetermined operation from a user, the printer driver 39 displays a setting change screen 70 (Step S304). If the printer driver 39 receives an operation of the setting change button 74 on the condition that a print job in a spool list 71 is selected (Step S305, S306; Yes), the printer driver 39 indicates a changing screen (driver screen for changing) to change a setting of the printing condition, and receives a changing operation for the printing condition (Step S307). Then, the printer driver 39 receives a operation to execute a change of the setting of the printing condition (Step S308; Yes), the printer driver 39 transmits a change request 44 to the composite machine 10 (Step S309).

Figure 7:
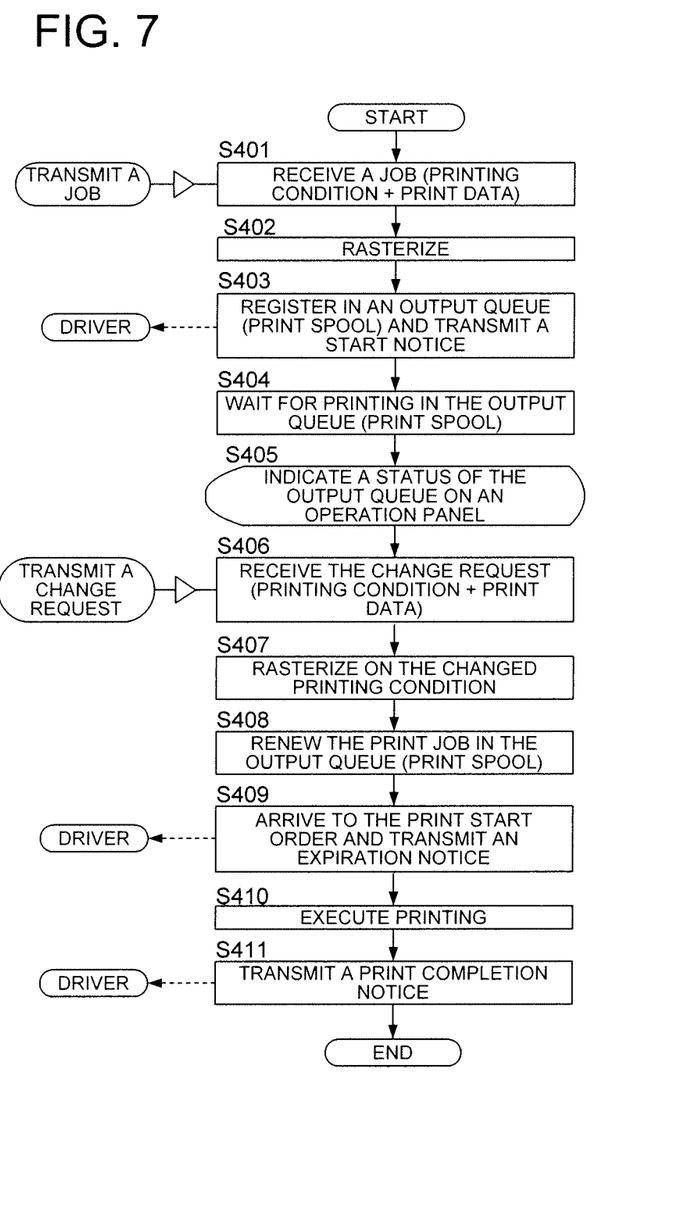
FIG. 7 is a flow chart showing processes at a composite machine side in the whole sequence shown in FIG. 3.

FIG. 7 shows the flow of the processes of the composite machine 10 in the whole sequence shown in FIG. 3. If the composite machine 10 receives a print job (printing condition data 41 and print data 42) from the terminal device 30 (Step S401), the composite machine 10 conducts a rasterizing process related to the print job, and produces image data (Step S402). After the completion of the rasterizing process, the composite machine relates the print job with the image data, registers the print job in the back end of an output queue 51, and transmits a start notice 43 to the terminal device 30 (the printer driver 39) being the transmitting source of the print job (Step S403).

The print job registered in the output queue 51 waits for printing on the print waiting condition (Step S404). A job list screen 60 as shown in FIG. 4 is indicated on the operation display section 18 of the composite machine 10 (Step S405).

Thereafter, when the composite machine 10 receives a change request 44 for a print waiting job registered in the output queue 51 from the printer driver 39 of the terminal device 30 (Step S406), the composite machine 10 conducts the rasterizing process in accordance with the printing conditions after the changing indicated by the change request 44 (Step S407). Furthermore, the composite machine 10 replaces the former print job being registered in the output queue 51 before the changing related to the change request with the changed print job related with the new image data after the changing, thereby the composite machine 10 renews the print job (Step S408).

Thereafter, after the registration order of the print job in the output queue 51 has been ranked up with the progress of the printing process, when the print job arrives at the order of starting printing, the composite machine 10 transmits a termination notice 45 related to the print job to the terminal device 30 being the transmitting source of the print job (Step S409). Further, the composite machine 10 executes printing related to the print job (Step S410). After the printing has been completed, the composite machine 10 transmits a print completion notice to the terminal device 30, and ends the process (Step S411).

As mentioned above, although the embodiment of the present invention has been explained with reference to the drawing, a concrete structure is not restricted to one shown in the embodiment. Even if there are modifications and additions in the range which those do not deviate from the gist of the present invention, those are included in the present invention.

For example, although the embodiment has been explained based on the example of the composite machine 10, the embodiment may be structured with a printing apparatus equipped only with a print function and not equipped with the image reading section 13 and the facsimile communication control section 23. Furthermore, although the embodiment is made such that the composite machine 10 conducts the administration of the output queue 51 and printing, the embodiment may be structured with a printing server (print control apparatus) which has not the printing section 14 and makes an external printing apparatus connected through a network to conduct printing. For example, the image reading section 13, the printing section 14, and the facsimile communication control section 23 are removed from the composite machine 10 showing in FIG. 1, and the embodiment may be made such that printing related to a print job taken out from the output queue 51 is conducted by an external printing apparatus connected through the network I/F section 22.

Moreover, in the embodiment, a period from a start notice 43 to a termination notice is made as a period to permit to change a setting of the printing condition related to the print job. However, the transmission of a start notice 43 is omitted and a period from the first transmission of a print job to the reception of a termination notice 45 related to the print job may be made as a period to permit to change a setting of the printing condition related to the print job. In this case, a change of a setting of the printing condition is made to be received also for a print job waiting for a rasterizing process, and when a change request 44 is received before the rasterizing process, the first rasterizing process may be made to be conducted on the printing condition after the changing.

In addition, in the embodiment, the print data 42 are made to be memorized in the hard disk drive 19 until the completion of printing. However, in place f memorizing the print data 42 as it is, the intermediate code in which a certain pretreatment is applied to the print data may be memorized.

In the embodiment, in place of taking out a print job from an output queue 51, the status of the job is changed from "waiting for printing" to "under printing" and when the printing has been completed, the print job is deleted from the output queue. However, the embodiment may be structured such that the print job is taken out from the output queue 51 at the time of starting printing, and the taken-out print job is shifted to a registration area provided separately and is administrated there.

What is claimed is:

1. A print control apparatus, comprising:
    a communicating section to communicate with a terminal device;
    a memory section to store image data therein;
    a control section to control operations of the print control apparatus;
    wherein the control section conducts (1) an extension register process, (2) an output process, (3) a period termination notice process, and (4) a change process;
    in (1) the extension register process, when the control section receives a print job from the terminal device, the control section produces image data related to the print job by a rasterizing process and stores the image data in the memory section, and then the control section relates the print job with the image data and registers the print job in an output queue;
    in (2) the output process, the control sections takes out the print job from the output queue and makes a printing device to conduct printing related to the print job by using the stored image data related with the print job;
    in (3) the period termination notice process, when the control section takes out the print job from the output queue, the control section notifies prior to completion of the print job the terminal device being a transmitting source of the print job of a termination notice that a period to permit to change a print condition related to the print job has been terminated; and
    in (4) the change process, when the control section receives a change request to change the printing condition for the print job before notifying the termination notice, the control section replaces the print job registered in the output queue with a print job having a changed printing condition in accordance with the change request.

2. The print control apparatus described in claim 1, wherein the control section conducts the change process without changing the order of the print job registered in the output queue.

3. The print control apparatus described in claim 1, wherein the control section replaces the image data stored in the memory section and related to the print job designated by the change request with image data produced on the changed printing condition in accordance with the change request.

4. The print control apparatus described in claim 1, wherein when the extension register process with regard to the print job received from the terminal end has been completed, the control section further conducts a period start notice process to notify the terminal device of a start notice that the period to permit to change the printing condition related to the print job has been started.

5. The print control apparatus described in claim 1, wherein the communicating section has a function to communicate with an external printing device and the control section makes the external printing device to conduct the printing in the output process.

6. The print control apparatus described in claim 1, wherein the print job includes print data and print condition data, and the control section performs the rasterizing process for the print data based on the print condition data so as to produce the image data, and stores the print data and the image data in the memory section.

7. The print control apparatus described in claim 6 wherein the change request is configured to include the changed printing condition and not to include the print data, and when the control section receives the change request, the control section reads out the print data from the memory, performs the rasterizing process for the print data based on the changed printing condition so as to produce changed image data, and replaces the image data included in the print job registered in the output queue with the changed image data.

8. The print control apparatus described in claim 6 wherein the print condition data includes at least one of a number of print sets, a stapling request, selection of one side printing or both side printing, and a print mode setting.

9. The print control apparatus described in claim 1, wherein when the control section takes out the print job from the output queue, the control section starts the output process.

10. The print control apparatus described in claim 1, wherein after the printing related to the print job has been completed, the control section notifies the terminal device of a print completion notice.

11. A printing apparatus, comprising:
a communicating section to communicate with a terminal device;
a memory section to store image data;
a printing section to print the image data;
a control section to control operations of the printing apparatus;
wherein the control section conducts (1) an extension register process, (2) an output process, (3) a period termination notice process, and (4) a change process;
in (1) the extension register process, when the control section receives a print job from the terminal device, the control section produces image data related to the print job by a rasterizing process and stores the image data in the memory section, and then the control section relates the print job with the image data and registers the print job in an output queue;
in (2) the output process, the control sections takes out the print job from the output queue and makes the printing section to conduct printing related to the print job by using the stored image data related with the print job;
in (3) the period termination notice process, when the control section takes out the print job from the output queue, the control section notifies prior to completion of the print job the terminal device being a transmitting source of the print job of a termination notice that a period to permit to change a print condition related to the print job has been terminated; and
in (4) the change process, when the control section receives a change request to change the printing condition for the print job before notifying the termination notice, the control section replaces the print job registered in the output queue with a changed print job having a changed printing condition changed in accordance with the change request.

12. The printing apparatus described in claim 11, wherein the control section conducts the change process without changing an order of the print job registered in the output queue.

13. The printing apparatus described in claim 11, wherein the control section replaces the image data stored in the memory section and related to the print job designated by the change request with image data produced on the changed printing condition changed in accordance with the change request.

14. The printing apparatus described in claim 11, wherein when the extension register process with regard to the print job received from the terminal end has been completed, the control section further conducts a period start notice process to notify the terminal device of a start notice that the period to permit to change the printing condition related to the print job has been started.

* * * * *